United States Patent [19]
Alderson

[11] Patent Number: 5,796,399
[45] Date of Patent: Aug. 18, 1998

[54] METHOD AND APPARATUS FOR PRESENTING A DATA RANGE FOR USER SELECTION OF A VALUE WITHIN THE RANGE VIA A GRAPHICAL USER INTERFACE

[75] Inventor: Graham Richard Alderson, Eastleigh, United Kingdom

[73] Assignee: International Business Machines Corporation, Armonk, N.Y.

[21] Appl. No.: 918,774

[22] Filed: Aug. 25, 1997

[30] Foreign Application Priority Data

Jan. 21, 1997 [GB] United Kingdom ............... 9701176

[51] Int. Cl.$^6$ ............................................. G06F 3/00
[52] U.S. Cl. ................... 345/339; 345/163; 345/123
[58] Field of Search ............................. 345/123, 163, 345/329, 331, 339, 341, 348, 349, 352

[56] References Cited

U.S. PATENT DOCUMENTS

| | | | |
|---|---|---|---|
| 5,285,205 | 2/1994 | Torres | 345/124 |
| 5,428,736 | 6/1995 | Kahl et al. | 345/339 |
| 5,550,562 | 8/1996 | Aoki et al. | 345/163 |
| 5,734,597 | 3/1998 | Molnar et al. | 345/352 |

FOREIGN PATENT DOCUMENTS 0543760  5/1993  European Pat. Off.

OTHER PUBLICATIONS

Master Window 3.1, Special Edition, Robert Cowart, Sybek, pp. 156, 170, 178 1993.

*Primary Examiner*—Raymond J. Bayerl
*Assistant Examiner*—Chadwick A. Jackson
*Attorney, Agent, or Firm*—Kevin J. Fournier

[57] ABSTRACT

User-selection of a data value within a range of data values is permitted via a graphical user interface of a computer. A user command is received to move a presently displayed value forward or backward within the range. An acceleration table is accessed based on the length of time the user has issued the command to obtain an index value which is then used to access a second table to obtain a delta value corresponding to the index value. The presently displayed value is then changed based on this delta value.

9 Claims, 2 Drawing Sheets

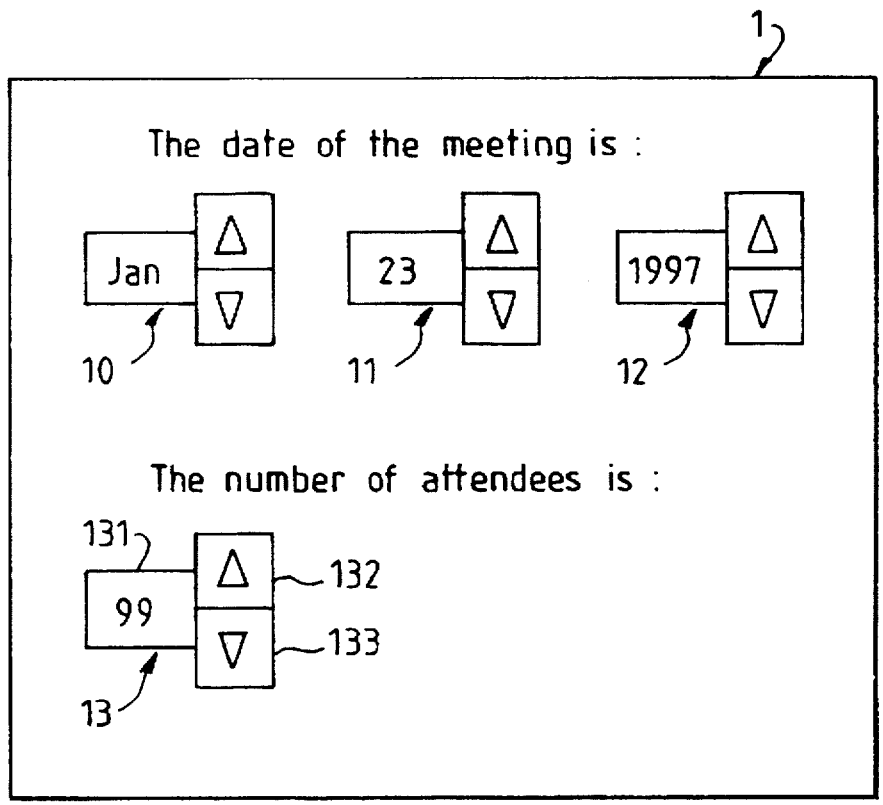
PRIOR ART FIG. 1
PRIOR ART FIG. 2

METHOD AND APPARATUS FOR PRESENTING A DATA RANGE FOR USER SELECTION OF A VALUE WITHIN THE RANGE VIA A GRAPHICAL USER INTERFACE

FIELD OF THE INVENTION

The present invention relates to graphical user interfaces (GUIs), and more specifically to a method and apparatus for presenting a data range for user selection of a value within the range as an input to a process executing on a data processing system.

BACKGROUND OF THE INVENTION

Digital computers have become more and more prevalent in everyday life, even for the non-scientific community such as home consumers. The increasing accessibility of computers for the layman has been driven by the increasing recognition of their usefulness, declining expense and the enhancement of what has been termed the "interface" between computer and user. An interface is where man and computer meet and communicate.

Interfaces have been enhanced to transfer the burden of communication from man to machine. Such interface enhancements have included the use of so called graphical user interfaces (GUIs) which are used to drive graphical metaphors in an interface. Graphical metaphors emulate in appearance a physical workstation equipped with common tools of trade, such as a clock, books and file cabinets. Users are presented with visual representations of common objects and the user need only select amongst the visual representations. The user is saved from having to know which choices are available and how to tell the computer that a particular choice is desired. With the GUI, the user need only position a cursor over a pictorial representation and click on a mouse button to inform the computer of his choice.

In order to select a particular value from a range of values for operation upon by a computer, various GUI pictorial representations are provided. A common example is the spin button. An example of such a GUI using spin buttons is provided in FIG. 1. A GUI screen 1 is displayed on the computer monitor for viewing by the user. The GUI screen 1 is used by the user to select a plurality of values to be processed by a computer program (also known as an application) being run by the computer. Four separate spin buttons 10, 11, 12 and 13 are shown in FIG. 1. Spin buttons 10–12 are used, in the example, to allow the user to select the month, day and year (respectively) of a proposed meeting. Spin button 13 is used to select the number of attendees at the meeting. Once the user selects these values, the computer runs an application using these values and returns a result to the user via the GUI which is displayed on the computer monitor screen.

A spin button (taking 13 as an example) is made up of three major components: an input field 131 where one value out of a range of values is displayed, an "up arrow" button (or increment button) 132 which allows the user to advance the value shown in the input field 131 higher in the range and a "down arrow" button (or decrement button) 133 which allows the user to decrease the value shown in the input field 131.

In order to accelerate the increment and decrement movement through the defined range, an acceleration table is often provided. As shown in FIG. 2, the acceleration table 2 contains two columns: one column 20 listing the amount of time for which the increment or decrement button has been pressed in, and a second column 21 indicating how much movement (a "delta" value) in the range should occur if one of these buttons is pressed for the amount of time indicated in column 20. For example, if the increment button 132 is pressed for one second the number shown in the input field 131 will increase by 5 values (e.g. from 99 to 104). Likewise, if the increment button 132 is pressed for 5 seconds the number shown will increase by 20 values (e.g. from 99 to 119).

When a software developer is creating a spin button for use in a specific application which makes use of a GUI, he/she must provide the computer's operating system with the highest possible value and the lowest possible value thus defining the range of possible data values from which the user can select a particular value (e.g. the range of the possible values that can show up in input field 131). The application writer must also provide the operating system with the time and delta values for the acceleration table. The operating system of any computer controls the execution of applications as well as the basic input and output functions of the computer. When a user, for example, uses the mouse input device to position the cursor over the increment button 132 and presses the mouse button for a certain period of time, the operating system looks up the delta value corresponding to this period of time in the acceleration table and returns the delta value to the "calling application" (the application which calls on the operating system to perform this function) which then adjusts the value in the spin button's input field 131 appropriately.

A major problem which exists in prior art spin button implementations is that the software developer can only supply a limited range of possible values to the operating system when setting up a spin button, because the operating system requires that this range be specified via a preset constant length field. For example, a popular operating system known as "Windows 95" (a trademark of Microsoft Corporation) requires that a spin button range be provided via a 15-bit field. This results in a largest possible range size of 32,768. This range is too small for many applications and a great need exists in the art to expand this range.

SUMMARY OF THE INVENTION

According to one aspect, the present invention provides a method of permitting user-selection of a data value within a range of data values via a graphical user interface of a computer, said method having steps of: receiving a user command to move a presently displayed value forward or backward within said range; accessing an acceleration table based on the length of time the user has issued the command to obtain an index value; using the index value to access a second table to obtain a delta value corresponding to said index value; changing the presently displayed value based on this delta value.

Accordingly, the range of total possible values which can be selected amongst can be greatly expanded without having to change the operating system. That is, even though the operating system is expecting a range of values limited by the range field the operating system provides for specifying this range, the range can be extended by inserting indexes into the acceleration table instead of delta values. Then, instead of using the acceleration table value to move the presently displayed value forward or backward, the acceleration table value (index) is referred to a second table stored in memory for obtaining the actual delta value that is then used to alter the presently displayed value.

Preferably, said command is issued by the user clicking a mouse on an up arrow or down arrow button on said graphical user interface. Further preferably, said index values are consecutive integers.

According to another aspect, the invention provides an apparatus for performing the above method steps.

According to yet another aspect, the invention provides a computer program product stored on a computer readable storage medium for performing the above method steps via a computer.

BRIEF DESCRIPTION OF THE DRAWINGS

FIG. 1 shows an example of a conventional graphical user interface with a plurality of spin buttons, in the context of which the present invention can be applied;

FIG. 2 shows an example of a conventional acceleration table for a spin button.

DETAILED DESCRIPTION OF THE PREFERRED EMBODIMENTS

Figure 3:
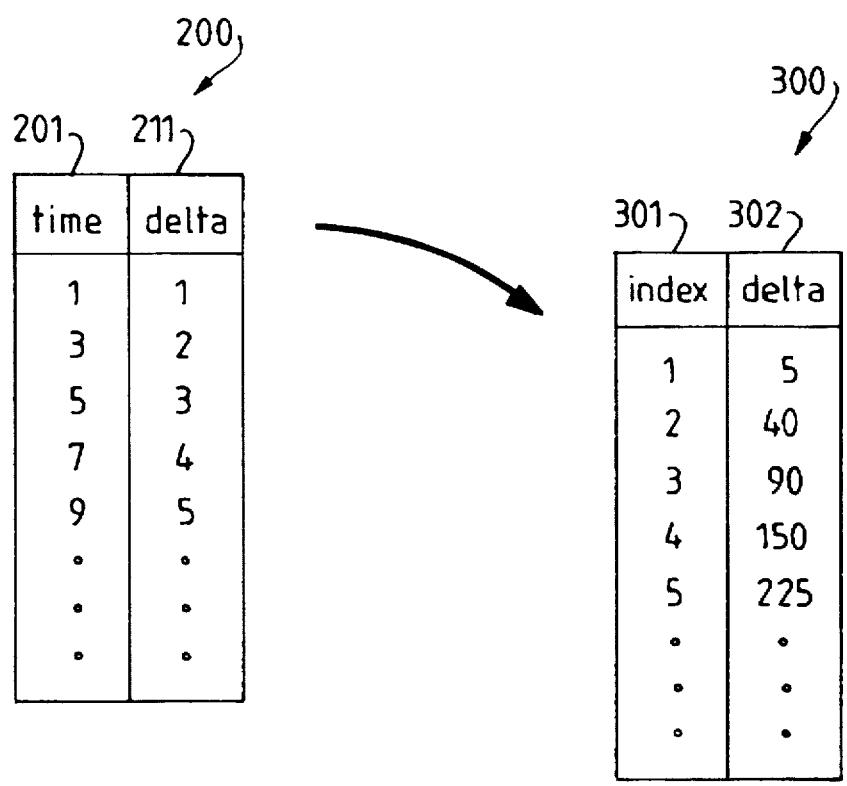
FIG. 3 shows a table mapping relationship according to a preferred embodiment of the present invention.

As the format of the acceleration table 2 (of FIG. 2) is dictated by the operating system, this format must be used by the software developer while developing an application which is being designed to run on the operating system. Also, the field length through which the developer supplies the operating system with the range of spin button values cannot be changed by the developer. The following system has thus been developed by Applicant to allow an extension of the range without making any changes to the underlying operating system.

As shown in FIG. 3, a normal acceleration table 200 is provided, such a table being identical in structure to the table 20 of FIG. 2 and conforming in format to that expected by the operating system that will access the table to determine delta values when an increment/decrement button is activated in for a certain period of time. However, rather than storing actual delta values in the "delta" column 211 as is well known, consecutively numbered indexes (1, 2, 3, 4, 5, . . .) are stored instead. The operating system proceeds as usual to access the acceleration table when a user presses an increment/decrement button and returns a delta value depending on how long the button was pressed.

However, once the calling application receives the delta value, this delta value is not used to directly add to or subtract from the current value in the input field (e.g. 131 of FIG. 1). Instead, the calling application takes the delta value supplied by the operating system and uses it to access a second table 300 stored in memory. This table contains two columns and stores the indexes in column 301 and the actual delta values in column 302. Thus, when the operating system provides an index from column 211 of acceleration table 200, the calling application program takes this index to table 300, finds the index in column 301 and then finds the corresponding actual delta value in column 302. It is this actual delta value which is then used by the application program to change the current value displayed in the input field of the spin button.

Running through an example from FIG. 3, if the increment button is pressed for three seconds, the calling application program would call on the operating system to access the acceleration table 200 to provide an initial "delta" value of "2". This is not used-as the actual delta value to modify the current value of the spin button. Instead, it is used as an index pointing to the other table 300. The calling application program would then take this "delta" value and use it as the "index" in column 301 to find the corresponding actual delta value "40" in column 302. This value "40" is then used to increase the current value shown in the input field 131 by 40 (the displayed value 99 would be changed to 99+40 or 139).

This allows the total possible range of values to be greatly expanded beyond that which the operating system allows. The indexes can point to a much wider range via the additional table. That is, the delta values in the additional table can be of such magnitudes that they can cause the presently displayed value in the input field to move over a range much wider than the range limit imposed by the operating system's constant length field.

As is well known in the art, the data values appearing in the input field of a spin button do not have to be purely numerical but can also be alphanumerical.

Besides taking the form of a method or apparatus, the invention can be embodied as a computer program product stored on a computer readable medium, such as a hard drive or semiconductor memory.

What is claimed:

1. A method of permitting user-selection of a data value within a range of data values via a graphical user interface of a computer, said method having steps of:

receiving a user command to move a presently displayed value forward or backward within said range;

accessing an acceleration table based on the length of time the user has issued the command to obtain an index value;

using the index value to access a second table to obtain a delta value corresponding to said index value;

changing the presently displayed value based on this delta value.

2. The method of claim 1 wherein said command is issued by the user clicking a mouse on an up arrow or down arrow button on said graphical user interface.

3. The method of claim 1 wherein said index values are consecutive integers.

4. An apparatus for permitting user-selection of a data value within a range of data values via a graphical user interface of a computer, said apparatus comprising:

means for receiving a user command to move a presently displayed value forward or backward within said range;

means for accessing an acceleration table based on the length of time the user has issued the command to obtain an index value;

means for using the index value to access a second table to obtain a delta value corresponding to said index value; and means for changing the presently displayed value based on this delta value.

5. The apparatus of claim 4 wherein said command is issued by the user clicking a mouse on an up arrow or down arrow button on said graphical user interface.

6. The apparatus of claim 4 wherein said index values are consecutive integers.

7. A computer program product for permitting user-selection of a data value within a range of data values via a graphical user interface of a computer, said product comprising:

means for receiving a user command to move a presently displayed value forward or backward within said range;

means for accessing an acceleration table based on the length of time the user has issued the command to obtain an index value;

means for using the index value to access a second table to obtain a delta value corresponding to said index value; and means for changing the presently displayed value based on this delta value.

8. The product of claim 7 wherein said command is issued by the user clicking a mouse on an up arrow or down arrow button on said graphical user interface.

9. The product of claim 7 wherein said index values are consecutive integers.

* * * * *